United States Patent [19]
Gemmel et al.

[11] Patent Number: 5,654,999
[45] Date of Patent: Aug. 5, 1997

[54] LIQUID METAL PLAIN BEARING

[75] Inventors: Edwin Gemmel, Erlangen; Bernhard Hiller, Buckenhof; Roland Koeppel, Erlangen; Wolfgang Kuehnel, Rudolstadt, all of Germany

[73] Assignee: Siemens Aktiengesellschaft, Munich, Germany

[21] Appl. No.: 616,313

[22] Filed: Mar. 15, 1996

[30] Foreign Application Priority Data

Mar. 20, 1995 [DE] Germany ............... 195 10 068.9

[51] Int. Cl.⁶ .................................... H01J 35/10
[52] U.S. Cl. .............................. 378/132; 378/133
[58] Field of Search ........................ 378/132, 133, 378/131

[56] References Cited

U.S. PATENT DOCUMENTS

| | | | |
|---|---|---|---|
| 5,068,781 | 11/1991 | Vetter | 378/133 |
| 5,195,119 | 3/1993 | Ono et al. | 378/133 |
| 5,210,781 | 5/1993 | Ono et al. | 378/125 |

FOREIGN PATENT DOCUMENTS

| | | |
|---|---|---|
| 0 373 705 | 8/1989 | European Pat. Off. . |
| 0 479 197 | 9/1991 | European Pat. Off. . |
| 28 52 908 | 6/1979 | Germany . |

*Primary Examiner*—Don Wong
*Attorney, Agent, or Firm*—Hill, Steadman & Simpson

[57] ABSTRACT

A liquid metal plain bearing has a rotating and a stationary bearing part between which a bearing gap filled with liquid metal is located. The rotating bearing part has in relation at least one ring groove arranged to the bearing gap so that liquid metal possibly emerging from the bearing becomes located in the ring groove during the operation of the bearing and is held in the ring groove by the effect of centrifugal force.

5 Claims, 3 Drawing Sheets

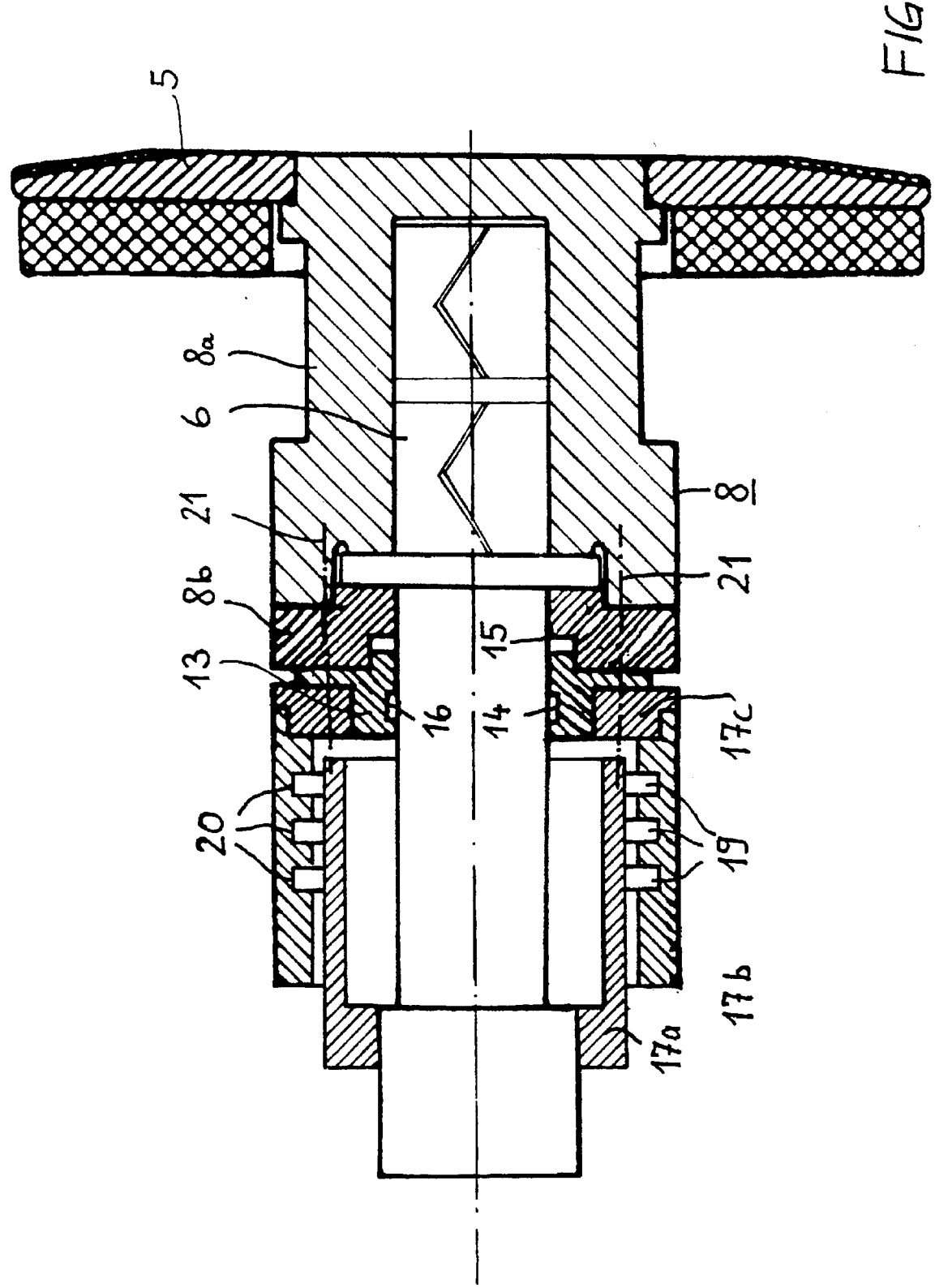

LIQUID METAL PLAIN BEARING

BACKGROUND OF THE INVENTION

1. Field of the Invention

The present invention is directed to a liquid metal plain bearing of the type having a rotating and a stationary bearing part, between which a bearing gap filled with liquid metal is located.

2. Description of the Prior Art

It is undesirable for liquid metal plain bearings of the above type to lose liquid metal, because the liquid metal is generally a highly reactive substance. As a rule, gallium, indium or tin alloys, which are already liquid at room temperature, are used as liquid metals. Liquid metal plain bearings are used, for example, in x-ray tubes in order to provide the rotating anode with bearings (see e.g. German OS 28 52 908, European Application 0 479 197 or U.S. Pat. No. 5,195,119), and are thereby normally housed in the interior of the vacuum housing of the x-ray tube. Liquid metal emerging from the liquid metal plain bearing is particularly harmful in for the case of x-ray tubes, because drops of liquid metal can endanger the high-voltage strength of the x-ray tube when they leave the area of the anode.

An x-ray tube known from European Application 0 373 705, has a rotating anode provided with bearings in the form of a liquid metal plain bearing. The rotor of an electromotor drives the rotating anode, and a carrier body serves for mounting of the stationary bearing part, are both thus provided with a coating of material, namely gold, that binds reactively to the liquid metal. The danger that liquid metal emerging from the liquid metal plain bearing will leave the anode area and endanger the high-voltage strength of the x-ray tube is thus reduced.

SUMMARY OF THE INVENTION

An object of the present invention is to provide a liquid metal plain bearing of the above-described type wherein the danger that liquid metal emerging from the liquid metal plain bearing will leave the anode area is further reduced.

This object is solved according to the invention in a liquid metal plain bearing having a rotating and a stationary bearing part, between which a bearing gap filled with liquid metal is located, wherein the rotating bearing part has at least one ring groove in the connection to the bearing gap, this groove being arranged so that liquid metal possibly emerging from the bearing gap flows into the ring groove, and so that liquid metal in the ring groove is held therein by the effect of centrifugal force during operation of the bearing. As used herein, locating the ring groove in the connection to the bearing gap is to be understood as meaning that the ring groove occupies a position so that liquid metal emerging from the bearing gap can "creep" along component surfaces into the ring groove before it can separate and leave the anode area. As long as the rotating anode is rotating, possibly emerging liquid metal is then held in the ring groove by the effect of centrifugal force.

In order to ensure that the liquid metal remains in the ring groove even when the rotating anode is not rotating, it is provided according to an embodiment of the invention that the ring groove, or, at least a part of the surface of the ring groove, is coated with a material that binds reactively to the liquid metal. If an alloy containing gallium and/or indium and/or tin is provided as a liquid metal, the ring groove is to be coated with a material containing gold and/or copper and/or nickel.

If the liquid metal plain bearing is used for the purpose of providing a rotational bearing arrangement for a rotating anode in an x-ray tube, wherein the rotating anode is connected with the rotating bearing part and with a tube-shaped rotor of an electromotor provided in order to drive the rotating anode, according to an embodiment of the invention that the rotor has at least one ring groove on its inner side. This ring groove may be the ring groove arranged in the relation to the bearing gap or an additional ring groove.

According to another embodiment of the invention, the rotor has a material on its outer side that binds reactively to the liquid metal. If liquid metal should actually flow to the outer side of the rotor, it is thus bound there and is prevented from leaving the area of the anode.

DESCRIPTION OF THE DRAWINGS

FIG. 3 in a representation analogous to FIG. 2, shows a further embodiment of a liquid metal plain bearing according to the invention.

DESCRIPTION OF THE PREFERRED EMBODIMENTS

Figure 1:
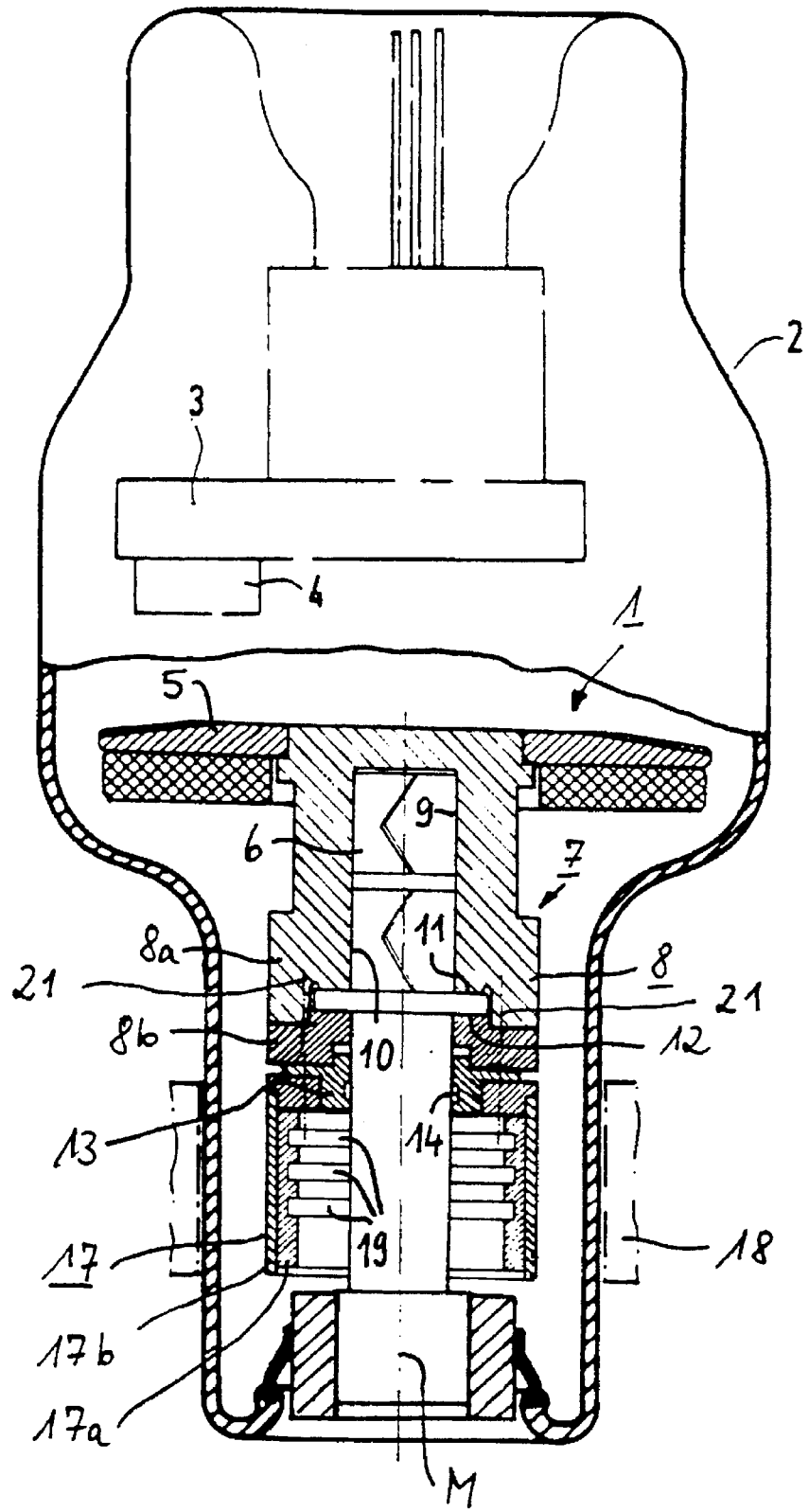
FIG. 1 is a longitudinal section through an x-ray tube having a rotating anode with a liquid metal plain bearing according to the invention shown in partial section.

In FIG. 1 an x-ray tube with a rotating anode is shown, having a rotating anode 1 housed in a vacuum bulb 2. The vacuum bulb 2 moreover contains, in a known arrangement, a cathode 3 having a filament (not shown in FIG. 1) contained in a concentrating cup 4.

In order to rotationally support the rotating anode 1, a liquid metal plain bearing, designated as a whole with 7, is provided, having a bearing axis 6 connected in a fixed manner with the vacuum bulb 2 as an interior plain bearing part. The anode dish 5 is fixedly attached to the exterior, rotating plain bearing part 8.

Figure 2:
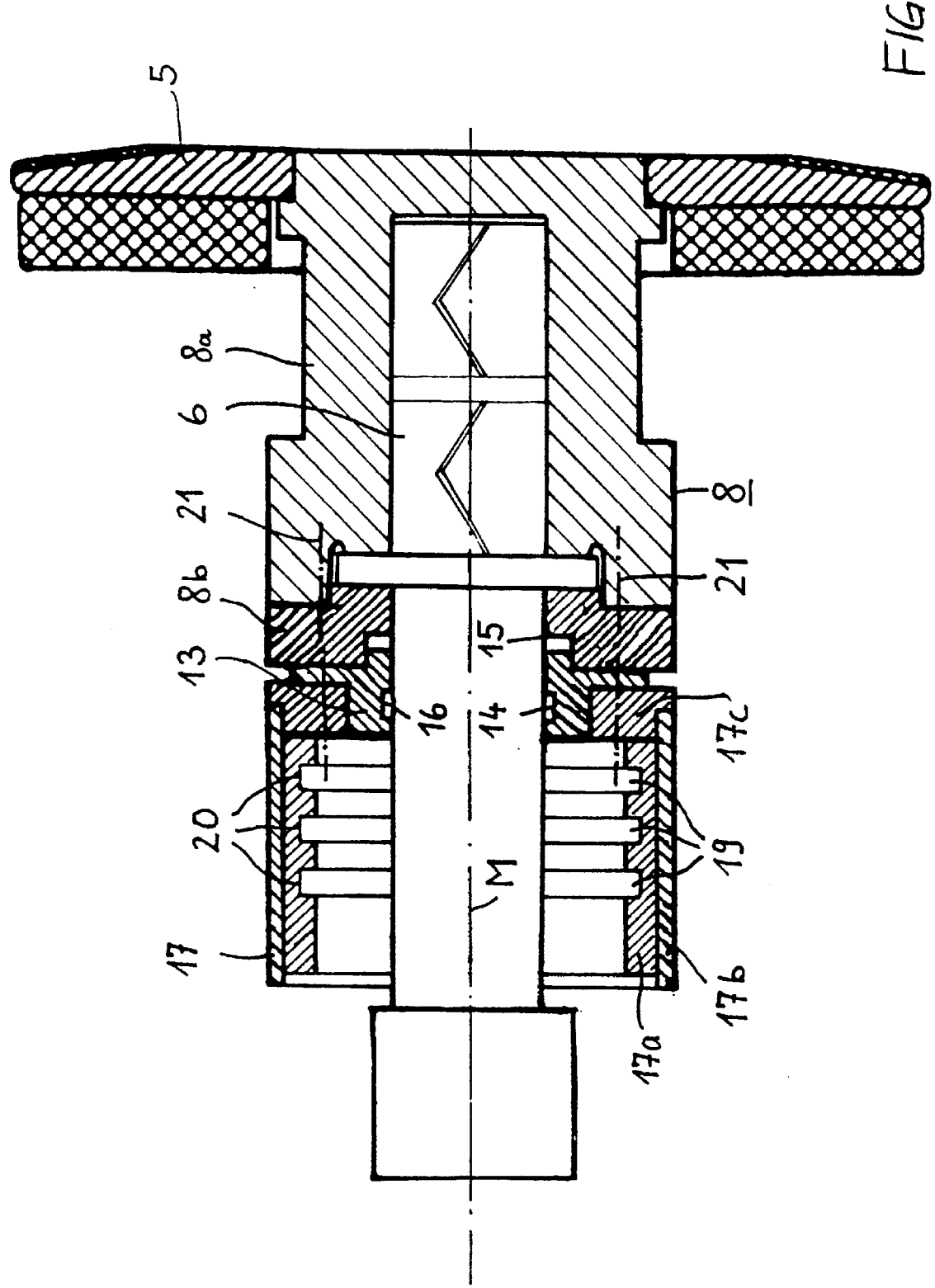
FIG. 2 is an enlarged section through the liquid metal plain bearing of FIG. 1

As can be seen in FIG. 2, the bearing axis 6 is constructed with a collar, so that between the exterior plain bearing part 8 (assembled from the two parts 8a and 8b) and the bearing axis 6, two cylindrical bearing surface pairs 9 and 10 are provided for the transmission of radial forces in relation to the center axis M of the rotating anode 1. This assemblage also provides two circularly annular bearing surface pairs 11 and 12 for the transmission of forces directed axially in relation to the center axis M are provided.

The bearing gap located between the bearing axis 6 and the exterior plain bearing part 8 is filled with a liquid metal (i.e. a metal that is already liquid at room temperature), which is not visible in FIG. 2.

In the area of the bearing surfaces, spiral-shaped channels may be provided in a known way, whose orientation is chosen so that during operation of the plain bearing they exhibit a conveyor effect that holds the liquid metal in the interior of the bearing. In the case of the exemplary embodiment according to FIGS. 1 and 2, the bearing surface 10 of the bearing axis 6 is for example provided with V-shaped channels in two annular zones respectively extending over the entire circumference of the bearing axis 6. For the illustration of these zones, a V-shaped channel is outlined in each of FIGS. 1 and 2.

A lock ring 13 is attached by means of screws to the exterior plain bearing part 8 (in FIG. 2 only the construction lines, designated with 21, of a few of the screws are shown), the lock ring 13 having an opening through which the bearing axis 6 extends. The cylindrical wall of the opening is provided with a ring groove 14, which is thus arranged in connection to the end of the bearing gap designated with 15 in FIG. 2.

By means of the same screws that serve to attach the lock ring 13 to the exterior plain bearing part 8, the rotor 17 of an electromotor provided in order to drive the rotating anode 1 is connected with the exterior plain bearing part 8. The rotor 17 operates together with a schematically outlined stator 18 located on the outer wall of the vacuum flask 2 in the area of the rotor 17, and together with it forms an electrical squirrel-cage motor that causes the rotating anode I to rotate when a corresponding current is supplied.

Liquid metal possibly emerging from the bearing gap thus "creeps" along the wall of the opening of the lock ring 13, or along the outer casing surfaces of the bearing axis 6, into the ring groove 14, and is held here during operation of the bearing by the effect of centrifugal force, since the ring groove 14 is, as mentioned, provided in the cylindrical wall of the opening of the rotating lock ring 13.

In order to hold the liquid metal in the ring groove 14 even when the liquid metal plain bearing is still, the ring groove is provided with a coating, represented in FIG. 2 with the reference number 16, of a material that binds with the liquid metal reactively, i.e. through alloy or bond formation.

The rotor 17 additionally has an interior cylindrically tubular part 17a, formed from a ferromagnetic material, and an exterior part 17b attached to the tubular part 17a in a fixed manner, also cylindrically tubular in shape and made from a non-magnetic, highly electrically conductive material. The interior and exterior parts 17a and 17b are attached to an annular flange 17c. On its inner side, i.e. in the area of the cylindrical inner side of the interior part 17a, the rotor 17 is provided with a number of ring grooves 19, in which liquid metal emerging between the lock ring 13 and the bearing axis 6 can collect in case the storage capacity of the ring groove 14 should become exhausted. The liquid metal "creeps" on the inner side of the rotor 17 along the flange 17c and the interior part 17a into the ring grooves 19, and is held in the ring grooves 19 by the effect of centrifugal force during operation of the x-ray tube. In the still state of the x-ray tube, liquid metal located in the ring grooves 19 is held therein, since the ring grooves 19 each have a coating 20 of a material that binds reactively with the liquid metal.

If an alloy containing gallium and/or indium and/or tin is provided as the liquid metal, a material containing gold and/or copper and/or nickel is suited for use as the material for the coatings 16 and 20 of the ring grooves 14 and 19.

If the coating consists of gold, it can be applied by sputtering. If the coating is made of copper or nickel, the coatings can be produced by means of an electroplating process.

It is particularly advantageous if the non-magnetic, highly electrically conductive material forming the exterior part 17b of the rotor 17 is also suited to bind reactively with the liquid metal employed. If it should happen that drops of liquid metal cannot be collected in the ring grooves 14 and 19, these drops then bind with the material of the exterior part 17b. If an alloy containing gallium and/or indium and/or tin is provided as the liquid metal, copper is particularly suited for use as the material for the exterior part 17b. In case the material of the exterior part 17b is not itself suited to bind reactively with the liquid metal employed, a suitable coating can be deposited on the exterior part 17b.

The exemplary embodiment according to FIG. 3 differs from the embodiment described above in that the ferromagnetic interior part 17a is connected in a fixed manner with the bearing axis 6.

The grooves 19 are thus provided in the rotating exterior part 17b. If the exterior part 17b is made from copper or from another non-magnetic, electrically highly conductive material that binds reactively with the liquid metal, a coating of the grooves 20 is unnecessary.

In the described exemplary embodiments, the surfaces provided with ring grooves are cylindrical surfaces. Surfaces shaped otherwise, however, can also be provided with a ring groove within the scope of the invention, as long as it is ensured that the liquid metal is held in the ring groove by the effect of centrifugal force.

In the described exemplary embodiments, the ring grooves respectively have a rectangular cross-section. However, cross-sections shaped otherwise can be provided within the scope of the invention, as long as it is ensured that the liquid metal is held in the ring groove by the effect of centrifugal force.

In the foregoing, the invention is specified with respect to the example of x-ray tubes. The employment of liquid metal plain bearings according to the invention, however, is not limited to their use in x-ray tubes.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray tube comprising:

an evacuated housing;

an anode disposed in said housing;

a rotatably mounted rotor disposed in said housing;

stator means disposed outside said housing for interacting with said rotor for rotating said rotor;

a liquid metal plain bearing rotatably supporting said anode disposed between said rotor and said anode and permitting rotation of said abode upon rotation of said rotor, said liquid metal plain bearing having a rotating bearing part separate from and co-rotatable with said rotor, and a stationary bearing part, with a bearing gap between said rotating and stationary bearing parts filled with liquid metal subject to emergence from said bearing gap; and at least one ring groove disposed on an inner side of said rotor and disposed relative to said bearing gap for causing liquid metal emerging from said bearing gap to flow into said ring groove of said rotor and for holding liquid metal in said ring groove of said rotor by centrifugal force during rotation of said rotor.

2. A liquid plain bearing as claimed in claim 1 further comprising a coating on said ring groove of a material which binds reactively to said liquid metal.

3. A liquid plain bearing as claimed in claim 2 wherein said liquid metal comprises an alloy containing at least one metal selected from the group consisting of gallium, indium and tin, and wherein said coating comprises a material containing at least one metal selected from the group consisting of gold, copper and nickel.

4. An x-ray tube as claimed in claim 1 wherein said liquid metal plain bearing further comprises a lock ring connected to said rotating bearing part, said lock ring having a lock ring groove therein into which liquid metal emerging from said bearing gap also flows, said lock ring groove having a diameter which is smaller than a diameter of said ring groove on said inner side of said rotor.

5. An x-ray tube as claimed in claim 1 wherein said rotor has an outer side coated with a material which binds reactively with said liquid metal.

\* \* \* \* \*